(12) United States Patent
Pedoja

(10) Patent No.: US 8,597,555 B2
(45) Date of Patent: Dec. 3, 2013

(54) METHOD FOR MANUFACTURING SOFT, RESISTANT AND BULKY NONWOVEN AND NONWOVEN THUS OBTAINED

(75) Inventor: Roberto Pedoja, Cuasso al Monte (IT)

(73) Assignee: Ahlstrom Corporation, Helsinki (FI)

( * ) Notice: Subject to any disclaimer, the term of this patent is extended or adjusted under 35 U.S.C. 154(b) by 940 days.

(21) Appl. No.: 12/513,051

(22) PCT Filed: Sep. 26, 2007

(86) PCT No.: PCT/EP2007/008360
§ 371 (c)(1),
(2), (4) Date: Jan. 8, 2010

(87) PCT Pub. No.: WO2008/052624
PCT Pub. Date: May 8, 2008

(65) Prior Publication Data
US 2010/0112273 A1    May 6, 2010

(30) Foreign Application Priority Data
Oct. 30, 2006    (EP) .................................. 06010422

(51) Int. Cl.
*D01D 5/253*    (2006.01)
*D04H 3/10*    (2012.01)
*D04H 3/16*    (2006.01)
*D06C 15/02*    (2006.01)

(52) U.S. Cl.
USPC .......... 264/103; 28/104; 264/132; 264/171.1; 264/172.12; 264/172.14; 264/177.13; 264/210.2; 264/210.3; 264/211.12; 264/211.18; 264/211.2; 264/234

(58) Field of Classification Search
USPC .............. 264/103, 132, 171.1, 172.14, 210.2, 264/210.3, 211.12, 211.18, 211.2, 234, 264/172.12, 177.13; 28/104
See application file for complete search history.

(56) References Cited

U.S. PATENT DOCUMENTS

| | | | | |
|---|---|---|---|---|
| 4,668,566 | A * | 5/1987 | Braun .......................... | 442/118 |
| 5,614,281 | A * | 3/1997 | Jackson et al. ................ | 428/100 |
| 2003/0106568 | A1 | 6/2003 | Keck | |
| 2004/0157036 | A1* | 8/2004 | Provost et al. .................. | 428/85 |
| 2005/0136777 | A1* | 6/2005 | Thomaschefsky et al. ... | 442/408 |
| 2005/0215155 | A1 | 9/2005 | Young et al. | |

FOREIGN PATENT DOCUMENTS

| | | |
|---|---|---|
| FR | 2 588 285 | 4/1987 |
| FR | 2 588 286 | 4/1987 |
| WO | WO 2004/083511 | 9/2004 |

OTHER PUBLICATIONS

International Search Report for PCT/EP2007/008360, mailed Jan. 7, 2008.
Written Opinion of the International Searching Authority for PCT/EP2007/008360, mailed Jan. 7, 2008.

* cited by examiner

*Primary Examiner* — Leo B Tentoni
(74) *Attorney, Agent, or Firm* — Nixon & Vanderhye P.C.

(57) ABSTRACT

The present invention relates to a method for manufacturing nonwoven and nonwoven obtainable by said method. Particularly, the invention relates to a nonwoven provided with improved tactile and absorbent characteristics, which make it suitable for use in the field of surface cleaning, personal hygiene, or formation of garments. The method is based on the use of lobed spunbonded filaments which have been treated by means of thickening means.

33 Claims, 14 Drawing Sheets

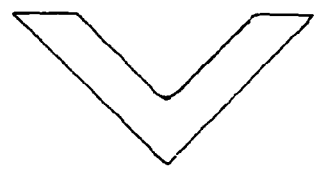
FIG.1
FIG.2
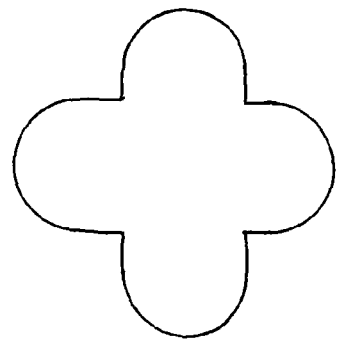
FIG.3
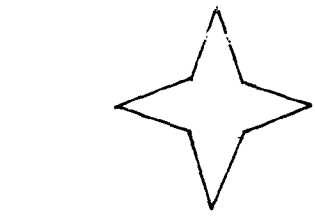
FIG.4
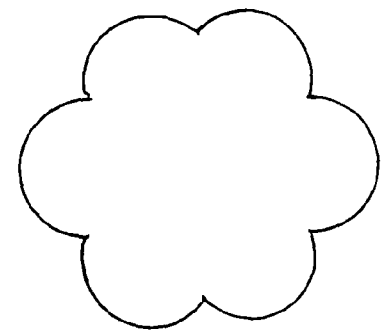
FIG.5
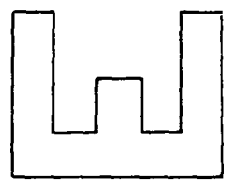
FIG.6
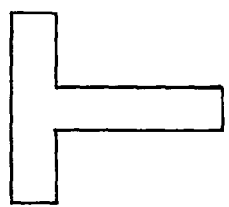
FIG.7
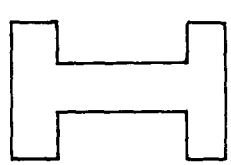
FIG.8
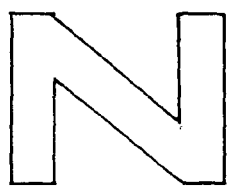
FIG.9
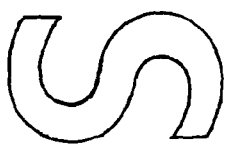
FIG.10
FIG.11

METHOD FOR MANUFACTURING SOFT, RESISTANT AND BULKY NONWOVEN AND NONWOVEN THUS OBTAINED

This application is the U.S. national phase of International Application No. PCT/EP2007/008360 filed 26 Sep. 2007 which designated the U.S. and claims priority to EP Application No. PCT/EP2006/010422 filed 30 Oct. 2006, the entire contents of each of which are hereby incorporated by reference.

FIELD OF THE INVENTION

The present invention relates to a method for manufacturing a nonwoven of the spunbonded type in-line and off-line and a nonwoven obtainable by said method. Particularly, the invention relates to a nonwoven provided with such improved tactile, resistant and bulky characteristics that make it suitable for use in the field of surface cleaning, personal hygiene, and formation of garments.

BACKGROUND OF THE ART

A nonwoven is widely used as a replacement for traditional textile products in numerous sectors, for example in the field of surface cleaning and protection, or in the production of garments. Compared to conventional fabrics, the nonwovens have the advantage of lower production costs, outstanding mechanical properties and a high biocompatibility with skin.

Among the nonwovens, those of the spunbonded type are formed either by synthetic (polymer) or natural material fibres which are laid on a mat in the form of a layer after being solidified when just coming out from the spinneret and subsequently attenuated at a prefixed distance from the spinneret by the application of forced air substantially at ambient temperature. The material forming said fibres is conventionally subjected to a stretching or elongation force causing the formation of continuous filaments.

The thus obtained structure can be consolidated by dynamic treatments such as bonding by stitches or by weft (calendering), or by jets of water (hydro-entanglement). Other bonding methods known in the field are mechanical needling, thermobonding, chemical bonding.

Generally, the spunbonding methods provide the extrusion of thermoplastic polymers through spinnerets such as to form a plurality of continuous filaments. These filaments, which are first solidified and then elongated, typically by means of a high-speed fluid, are random laid on a collecting surface such as a conveyor belt and form a non-consolidated ply. Subsequently, the filaments are bonded to provide the final ply having cohesion and strength characteristics.

The bonding step can be obtained by directly applying heat and pressure to the non-consolidated ply by means of heated calenders.

Particularly, after the non-consolidated ply has been laid down, it is carried on said conveyor belt to the calenders where it leaves the belt and is taken by two calender rolls to be heated and crushed. Thereby, the polymer ply is only carried until reaching the calenders and both rollers of the same calenders also act as the supports/conveyors as well as consolidators for the ply.

The product resulting from said method is normally in the form of a very thin ply, in the range of 0.18-0.3 mm weighing 15-17 g/m², compact, of threadlike appearance, and provided by slightly embossed patterns defined by the gaps between the cohesion points of the calender design.

Such a product, though showing good cohesion properties, is not very suitable for use in the hygiene sector, and however in those sectors requiring particular performance in terms of softness and thickness.

In addition, the cohesion is not sufficient when the product is used for instance in the cleaning field or as garments so that the product easily tends to wear out and, further, tends to cause a undesirable "pilling" effect particularly when the cohesion is carried out by hydroentangled technology, i.e. formation of fine loops onto the surface of the final product which engage with the roughness of for instance hands during using.

SUMMARY OF THE INVENTION

Therefore, the object of the present invention is to provide a nonwoven which is provided with improved softness and bulky properties compared to known products though still retaining optimum cohesion properties and avoiding the pilling effect.

This object is achieved by a method for manufacturing a nonwoven and a nonwoven thus obtained, such as claimed in the independent claims annexed below.

A first object of the present invention is to provide a method for manufacturing a nonwoven of the spunbonded type.

A second object is to provide a nonwoven obtained by said method, wherein the end product is particularly advantageous in terms of softness, bulky, and cohesion.

BRIEF DESCRIPTION OF THE DRAWINGS

Further characteristics and the advantages of this invention will be better understood from the following detailed description of some embodiments thereof, which are provided by way of non-limiting examples wherein:

FIG. 1 is a schematic view of a cross-section of a filament in accordance with a first embodiment of the invention;

FIG. 2 is a schematic view of a cross-section of a filament in accordance with a second embodiment of the invention;

FIG. 3 is a schematic view of a cross-section of a filament in accordance with a third variant embodiment of the invention;

FIG. 4 is a schematic view of a cross-section of a filament in accordance with a four embodiment of the invention;

FIG. 5 is a schematic view of a cross-section of a filament in accordance with a fifth embodiment of the invention;

FIG. 6 is a perspective view of a cross-section of a filament in accordance with a sixth embodiment of the invention;

FIG. 7 is a schematic view of a cross-section of a filament in accordance with a seventh embodiment of the invention;

FIG. 8 is a schematic view of a cross-section of a filament in accordance with an eighth embodiment of the invention;

FIG. 9 is a schematic view of a cross-section of a filament in accordance with a ninth embodiment of the invention;

FIG. 10 is a schematic view of a cross-section of a filament in accordance with a tenth embodiment of the invention;

FIG. 11 is a schematic view of a cross-section of a filament in accordance with an eleventh embodiment of the invention;

DETAILED DESCRIPTION OF THE INVENTION

Figure 12:
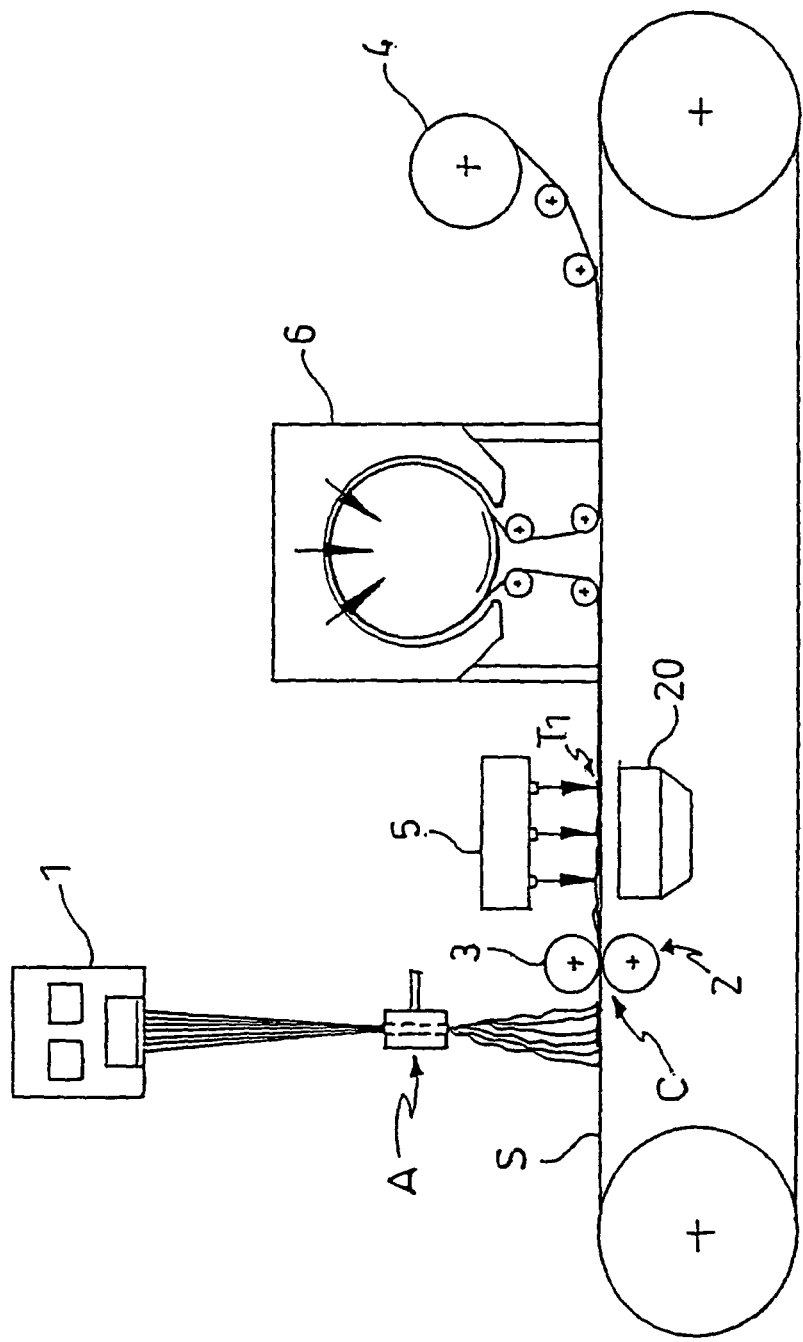
FIG. 12 is a schematic view of a manufacturing process according to the invention.

As stated above, the scope of the present invention is to provide a particular kind of nonwoven designed in order to improve the bulky and softness characteristics while, at the same time, to improve the its cohesion.

The idea upon which the invention is based is therefore to modify the structure of nonwoven in order to achieve the desired results. With this aim in mind, it has been proposed to modify the structure of the basic elements composing the nonwoven structure, i.e. the spunbonded filaments.

Several experiments have been carried out to verify if changing in the shape of the single filaments could bring to any advantages. In particular, the typical rounded cross-section of the filaments has been modified.

Surprisingly, it has been found that filaments having a lobed cross-section produced by suitable spunbonded spinnerets and entangled in order to form a mono or multi layered nonwoven can provide all the desired effects of improving softness, bulkiness and resistance.

In particular, spunbond filaments according to the present invention can be provided by means of conventional spunbond technologies and apparatuses wherein the corresponding spinnerets are modified in order to have orifices with holes presenting lobed shapes.

It is to be noticed that with the term "lobed filaments" it is intended a cross-section of a spunbond filaments whose external perimeter is not constant in its direction but changes. In other words, the external perimeter of the cross-section is provided with grooves alternated by protrusions or lobes.

For instance, as represented in the drawings, protrusions or lobes can have a rounded shape (FIGS. 1 and 3) or angular shape (FIG. 2). Moreover, they can be symmetric or asymmetric.

In addition, they can reproduce substantially the shape of letters, such as "T", "Y", "I", "Z", "E", "S", "C", numbers like "3", signs like ">" or symbols like stars (FIGS. 2, 4-11).

The main feature all the particular cross-sections of the spunbond filaments should have is to allow the definition of spaces and, at the same time, to allow a sort of connection between filaments when they are entangled to form a web of nonwoven. In fact, from one side the protrusions of a filament can randomly engage the grooves of another filament to create a connection and from the other side protrusion can randomly create spaces between cores of the filaments.

Accordingly, when the filaments are entangled, the nonwoven web of mono or multi layers shows an improved cohesion due to the above engagements and, at the same time, an improved volume due to the above spaces which consequently corresponds to an improved softness.

It is also to be noticed that the spaces so created can be advantageously filled up with for instance lotions, detergents, creams depending on the particular use the operator intends to do. Alternatively, said spaces can act as absorbent spaces when the nonwoven is used to absorb liquids in an improved manner with respect to the known nonwovens.

Furthermore, it has also surprisingly observed that if the above lobed spunbond filaments are used in a method for manufacturing a spunbonded nonwoven as described later, the softness, bulkiness and cohesion can be further implemented.

In view of the above, with reference to FIG. 12, the first object of the present invention is a method for manufacturing spunbonded nonwoven comprising the step of:

a) laying at least one layer $T_1$ of lobed spunbonded continuous filaments on a suitable support S;

b) treating said layer $T_1$ such as to obtain an increase in the thickness thereof by passing the layer $T_1$ through means of thickening which comprises two rollers 2, 3 and at least one surface provided with ribs having an height comprised between 0.3 and 5 mm, a free head with a contact surface for said filaments having an extension of less than 0.80 mm$^2$, said ribs being distributed so that to cover less than 14% of said at least one surface.

Preferably, step b) takes place by means of said thickening means which comprises two rollers 2, 3, for instance of a conventional compactor or embosser, and a support S having said particular surface, in contact with said filaments, provided with the above described ribs.

Moreover, the height of the ribs can preferably be from 0.5 to 3, more preferably from 0.8 to 1 mm, the contact surface of the free heads of the ribs can preferably be from 0.70 to 0.20 mm$^2$, more preferably about 0.50 mm$^2$ and the distribution of the ribs can preferably be so that to cover 10-5%, more preferably 9-7% on said surface.

By the term "continuous thread filaments" is meant herein continuous filaments substantially endless consisting of one or more polymer components, either synthetic or natural, optionally splittable into two continuous individual microfilaments. Polymer filaments splittable into microfilaments are splittable bi-component lobed polymer filaments.

Step b) of treatment to obtain an increased thickness of the nonwoven layer may be called, in other words, "thickening", thereby meaning an operating step allowing to turn the filaments of a spunbonded nonwoven laid on a support in the form of a thin, threadlike, and non-consolidated ply into a non-consolidated or poorly consolidated ply (pre-consolidation) of a cotton wool-like, thick, and soft appearance.

As stated above, it has been surprisingly found that if the thickening step is carried out on a rib-operated, i.e. embossed, and however not smooth surface, using lobed spunbonded filaments the resulting ply gains unexpected properties of softness, thickness and cohesion or resistance which are considerably increased compared to any other nonwoven ply of the spunbonded or carded type produced without said combination of method and filaments.

On the basis of this result, different variant embodiments of a nonwoven of the spunbonded type, both single-layer and multi-layer, have been provided.

For the production of a single layer (FIG. 12), the manufacturing steps generally comprise feeding the nonwoven layer $T_1$ in the form of filaments by means of a spinneret 1 (extruder) coupled to a conventional suction fan A, a hydro-entangling station 5, a drying station 6 and a rewinding station 4 of the hydro-entangled layer on a roller.

Particularly, step a) of laying a single layer comprises, such as schematically represented in FIG. 12, extruding the nonwoven layer $T_1$ in the form of continuous lobed filaments by means of a spinneret 1 (extruder) having suitable orifices to produce the above described lobed cross-sections and laying said filaments on a suitable support S by means of a conventional suction fan A.

Step b) of thickening is preferably carried out by passing the layer $T_1$, supported by support S, between two rollers 2 and 3 of a conventional compactor or embosser C.

It should be noted that by the term compactor or embosser is meant herein a device known per se, such as described below, which has only the function of changing the surface of a nonwoven ply to obtain a slight consolidation (pre-consolidation) and in addition, in the case of embosser, such as to form patterns, writings or drawings in relief. In other words, the compactor would have a pre-consolidation function, actually weak, whereas the embosser would have a preconsolidation and ornamental function, thereby increasing the thickness of the ply. On the contrary, the conventional calender, though being provided with a similar general structure, has the basic function to consolidate, and bond the fibres or filaments composing the nonwoven while minimizing or at most maintaining the ply thickness being laid down.

Preferably, roller 2 of the compactor generally has a thermoplastic smooth rubber surface for the layer $T_1$ to be pressed thereon, which layer is supported by support S, by means of roller 3. Roller 3 is normally made of smooth metal materials. Moreover, roller 3 is heated to the polymer filaments melting temperature. Accordingly, due to the use of lobed spunbonded filaments, mechanical action of both rollers, the heating of the filaments and the three-dimensional support S (mat interposed between both cylinders) the thickening of the nonwoven layer $T_1$ or, in other words, a "volumizing effect", a "flimsy effect" is thus obtained. In the case where an ornamental appearance is also desired, the embosser may be used, where the support S has deeper, more marked ribs and respective grooves, i.e. the ornamental matrix, such as to obtain the desired ornamental effect.

On the other hand, roller 3 in a conventional calender is engraved, i.e. it has ribs in the form of dots or dashes evenly alternating with grooves. In particular, the ribs have a height comprised between 0.4 and 0.6 mm, a free head with a contact surface for the filaments of 0.88 mm$^2$ and a distribution so that to cover 19-23% of the surface of the roller. It is to be noticed that said combination of features is just responsible of a firm consolidation of the nonwoven ply.

As already explained above, these ribs in the calender act by forming melting points. Moreover, in the calender, the nonwoven ply is not supported by any support. On the contrary, either in the compactor device or in the embosser, ribs on rollers are not provided or provided so that to create the above described effects typical of conventional embossers or compactors. On the other hand, there is provided a support S having a three-dimensional surface which gives considerable thickness, softness, and the above mentioned cotton wool-like appearance. These effects are further improved by means of the use of the above described lobed spunbonded filaments.

In addition, as already stated, the use of the lobed filaments improves considerably the cohesion between filaments so that the whole nonwoven results much more resistant to wearing and is free from the peeling effect.

Figure 16A:
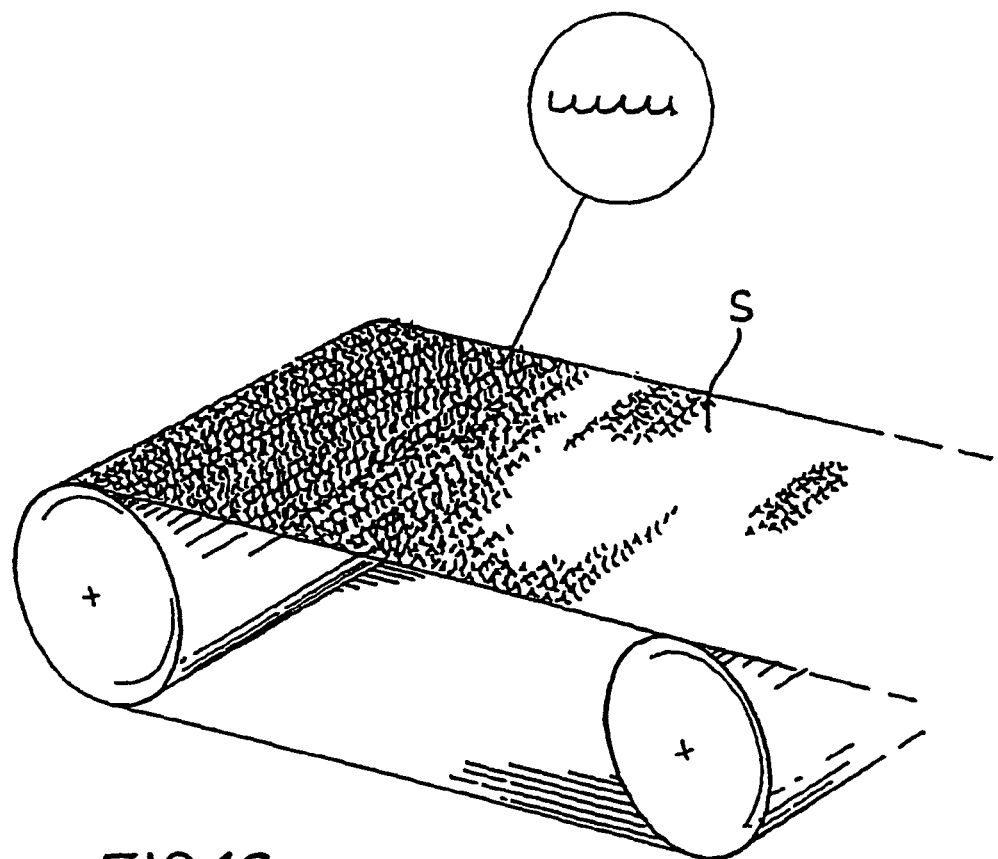
FIG. 16a is a perspective view of the support for the nonwoven filaments of the invention.
Figure 16B:
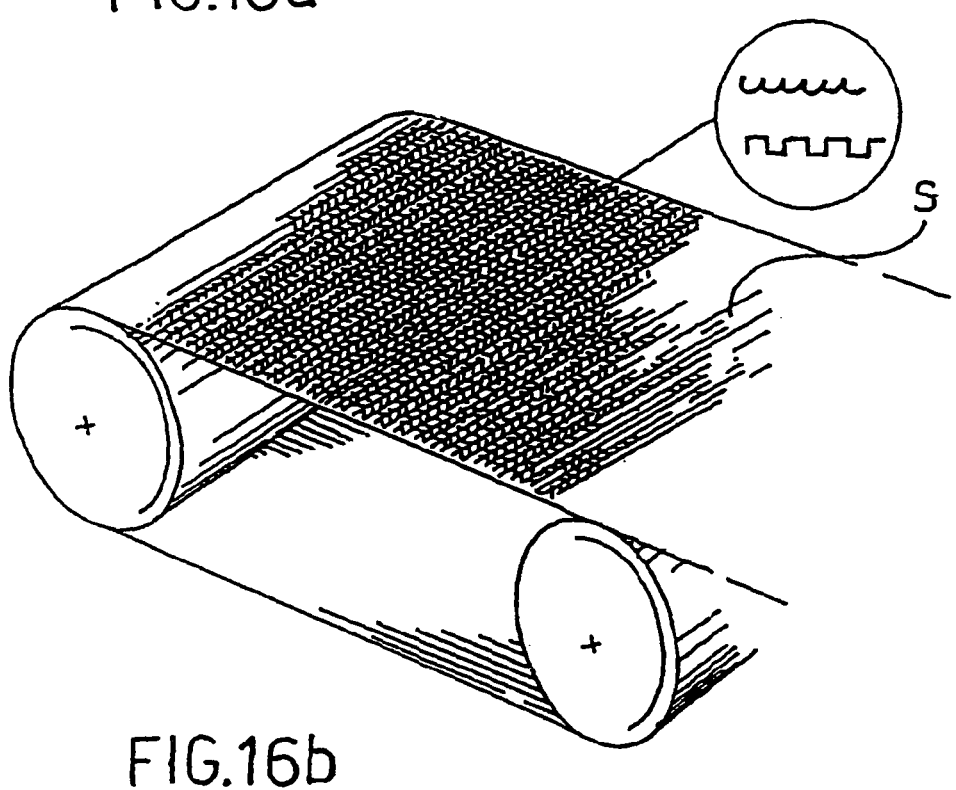
FIG. 16b is a perspective view of a variant of the support for the nonwoven filaments of the invention.

Support S can be a single continuous support stretching beneath all the nonwoven working stations and is advantageously provided with a surface in contact with the filaments, which is provided by ribs alternating with grooves. Non-limiting examples of said support S can be those represented in FIGS. 16a and 16b where the contact surface with said filaments has a section with crimps or steps according to what has been described in the international patent application PCT/IT2004/000220 in the name of the same applicant. Alternatively, the ribs can be either dots or dashes. Furthermore, said ribs can be of any other known conventional type such as truncated pyramid with substantially squared base or truncated cone with oval or circular base, the last one being the preferred shape.

Accordingly, as described above, when the spunbonded filaments are passed between two rollers 2 and while being supported by a support S such as that described above, the resulting ply acquires softness, smoothness and thickness similar to cotton wool.

Moreover, the effect described above can be created by employing lobed continuous spunbonded filaments on a support surface having ribs of substantially any shape, which filaments can be passed between the rollers of a compactor or embosser according to conventional procedures together with for instance carded fibres. In any case, the support S should be sufficiently solid to withstand the operating pressure of rollers 2 and 3 and withstand the fibre melting temperature.

Therefore, the support S described above can be a conveyor belt or tape made of any type of plastic material which is normally used in the field. Preferably, the support S is a metal sheet or a hard heat-resistant plastic sheet. Preferably, support S can further consist of a punched sheet through which the air can be sucked in order to maintain the filaments adherent to said sheet while they are being worked.

This support S can alternatively be a closed conveyor belt (not shown) limited to the level of rollers 2 and 3 of compactor or embosser C. Thereby, the filaments can be laid on a conventional support which carries said filaments to said conveyor belt such as to deliver the filaments thereto and allow the thickening treatment to be carried out in the advantageous conditions described above.

Following the passage of ply $T_1$ of lobed continuous spunbonded nonwoven supported by support S through the compactor C, the ply $T_1$ passes underneath the hydro-entangling machine 5 to be consolidated (step c)) in accordance with widely established methods. Subsequently, the ply $T_1$ is conventionally dried in dryer 6 (FIG. 12).

In addition, such as shown in FIG. 12, the fabric ply $T_1$ can be wound around a winding roller 4, also of the conventional type.

Particularly, the single- or multi-layer nonwoven can be of the hydro-entangled type based on splittable bi-component continuous filaments. The nonwoven filaments generally consist of only one component; however, for personal care products they may also be manufactured in the bi-component form, through the joint extrusion of different polymers according to known technologies. It is to be noticed that in any case the bi-component filaments have to be produced in order to maintain a lobed profile even when splitted.

In addition, the multi-layer composite nonwovens can contain one or more nonwoven layers, associated to a layer of cellulose fibres: in such cases, the final composite advantageously combines the mechanical properties of the nonwoven with the absorbent properties of the cellulose fibres.

The above bi-component filament technology is described in the patent application PCT/IT2004/000220 in the name of the same applicant and fully incorporated herein by reference.

Production of Splittable Synthetic Polymer Filaments

For the production of a single layer, reference is made to what is illustrated in FIG. 12, where the difference from the method described above is that the spinneret 1 employed is herein a device, known per se, which is capable of manufacturing polymer filaments splittable into lobed microfilaments.

For the details of each step, reference should be made to the description below, with reference to FIGS. 13, 14 and 15 in which the steps with similar names are identical to those outlined above.

The method for manufacturing a nonwoven, according to this first variant embodiment of the invention, comprises the manufacturing steps a) to b) such as described above, in which the filaments laid in step a) comprise splittable bi-component lobed polymer filaments which split into mono-component lobed microfilaments by entangling to one other during the consolidation step by hydro-entanglement.

Figure 13:
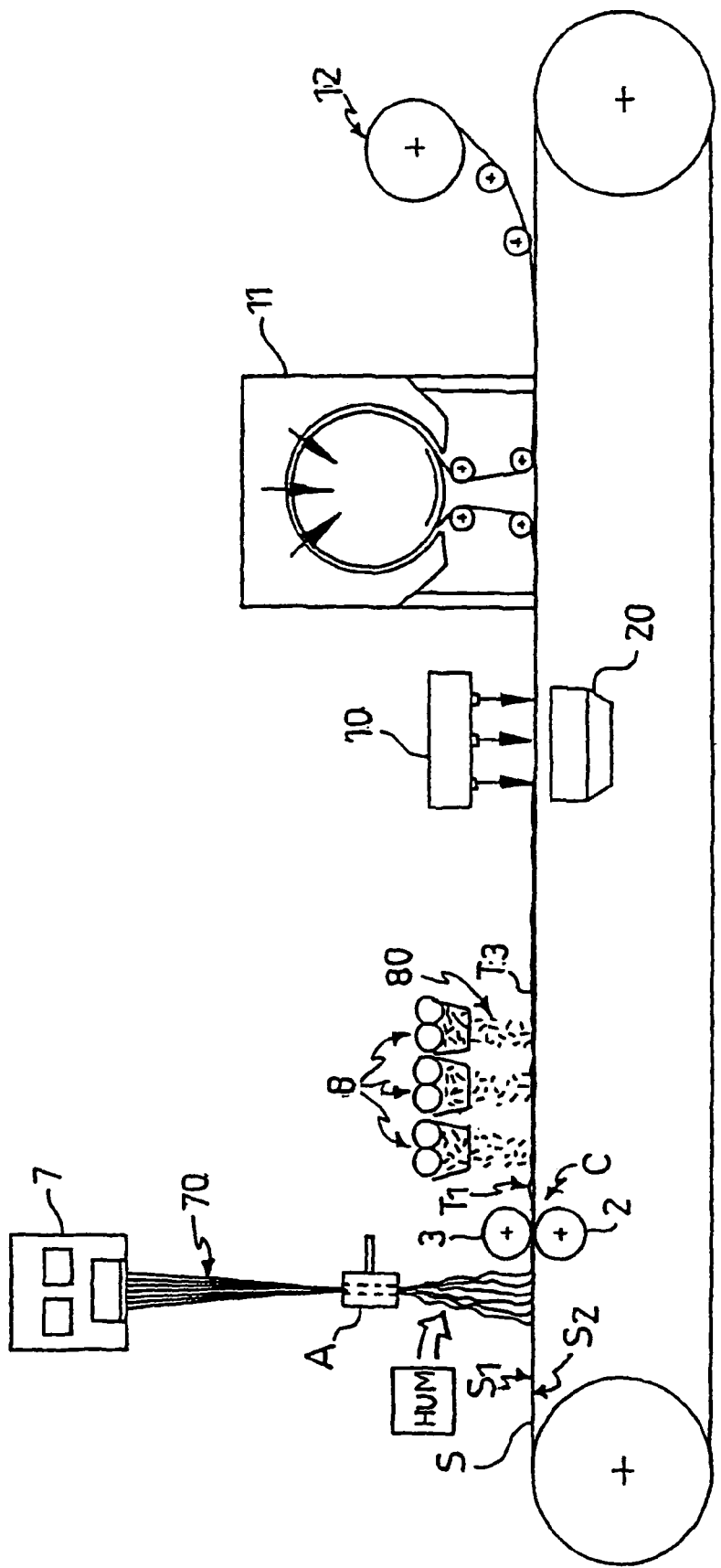
FIG. 13 is a schematic view of a manufacturing process in accordance with a first variant embodiment of the invention.

According to a variant embodiment of the invention, such as illustrated in FIG. 13, the method provides a further step of laying at least one layer of absorbent material fibres $T_3$ on said at least one layer $T_1$ subsequent to the thickening step b), therefore the hydro-entangling step takes place such as to obtain a nonwoven in which the bi-component polymer filaments split into mono-component micro-filaments entangle with one another and with the fibres of the absorbent material.

Generally, said method provides feeding the nonwoven first layer $T_1$ through a suitable spinneret 7, one or more stations 8 for laying the cellulose pulp 80, hydro-entanglement 10, drying 11 and rewinding on a roller 12.

On the other hand, the manufacture of a three-layer composite in accordance with the invention (FIG. 14a where the same reference numbers as those from Figure designate similar operating equipment or stations) generally provides feeding the first nonwoven layer $T_1$ through a suitable spinneret 7 according to the above description, one or more stations 8 for laying the cellulose pulp 80, laying a second nonwoven layer $T_2$ similar to the nonwoven layer $T_1$ through a suitable spinneret 9, hydro-entanglement 10, drying 11 and rewinding on a roller 12.

Referring to a multi-layer product, it is widely known that splittable bi-component lobed filaments may be produced through extrusion by spinnerets of polymer materials so as to form continuous filaments. These filaments, on output from the spinnerets, are hit by a jet of compressed air that causes the elongation and the electrostatic charging thereof such to cause a mutual repulsion causing them to fall randomly onto a conveyor belt.

Figure 14A:
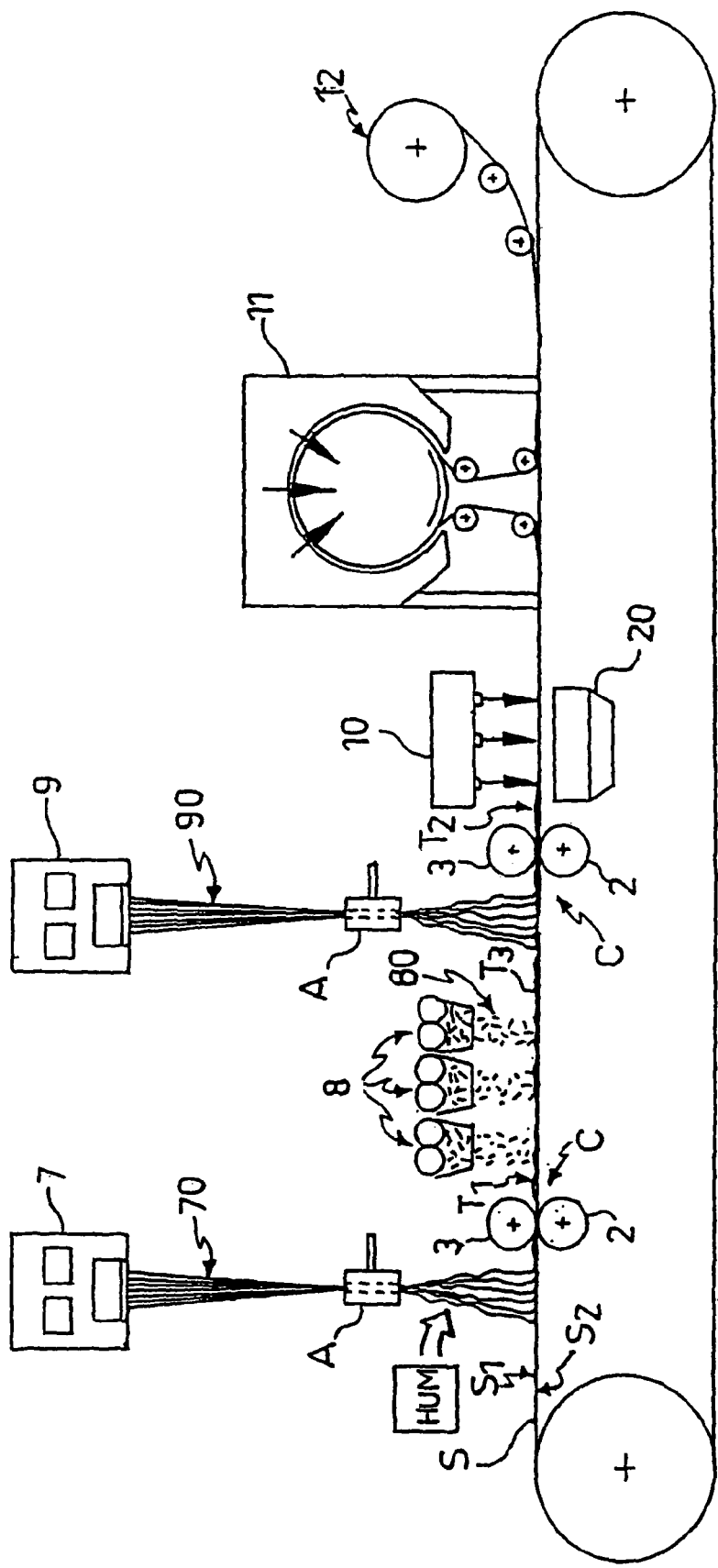
FIG. 14a is a schematic view of a manufacturing process in accordance with a second variant embodiment of the invention.
Figure 15A:
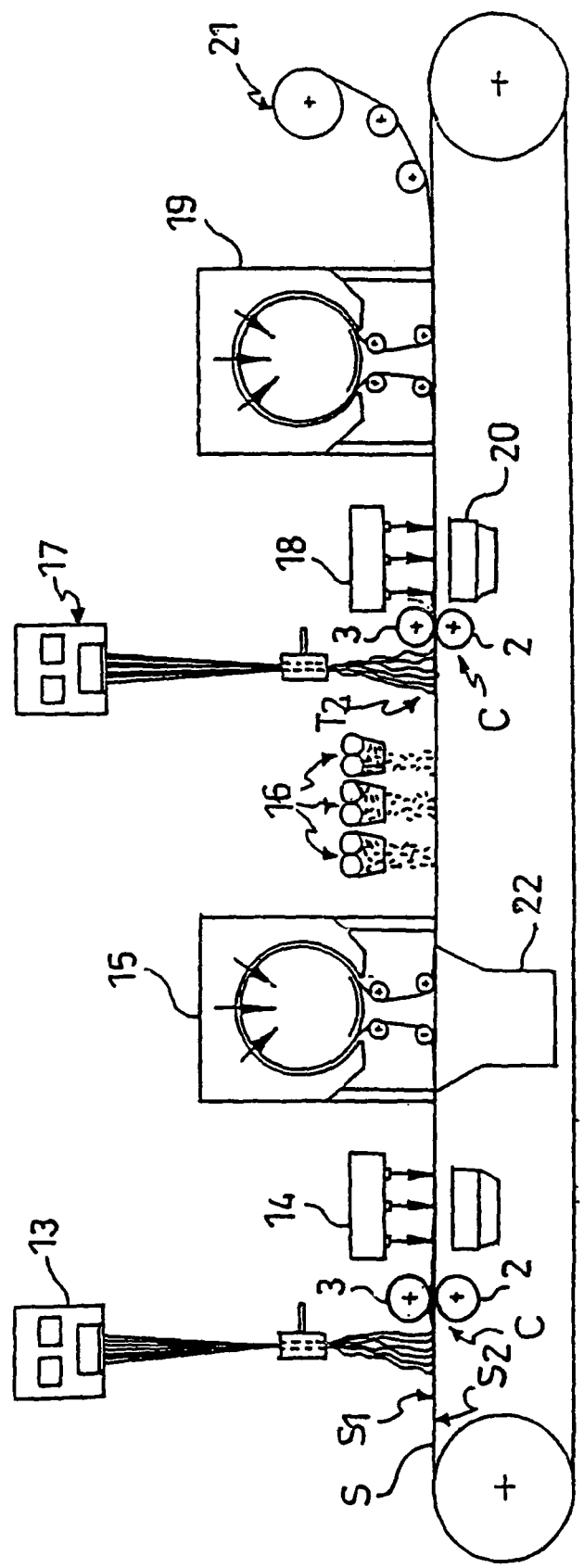
FIG. 15a is a schematic view of a manufacturing process in accordance with a fourth variant embodiment of the invention.
Figure 15B:
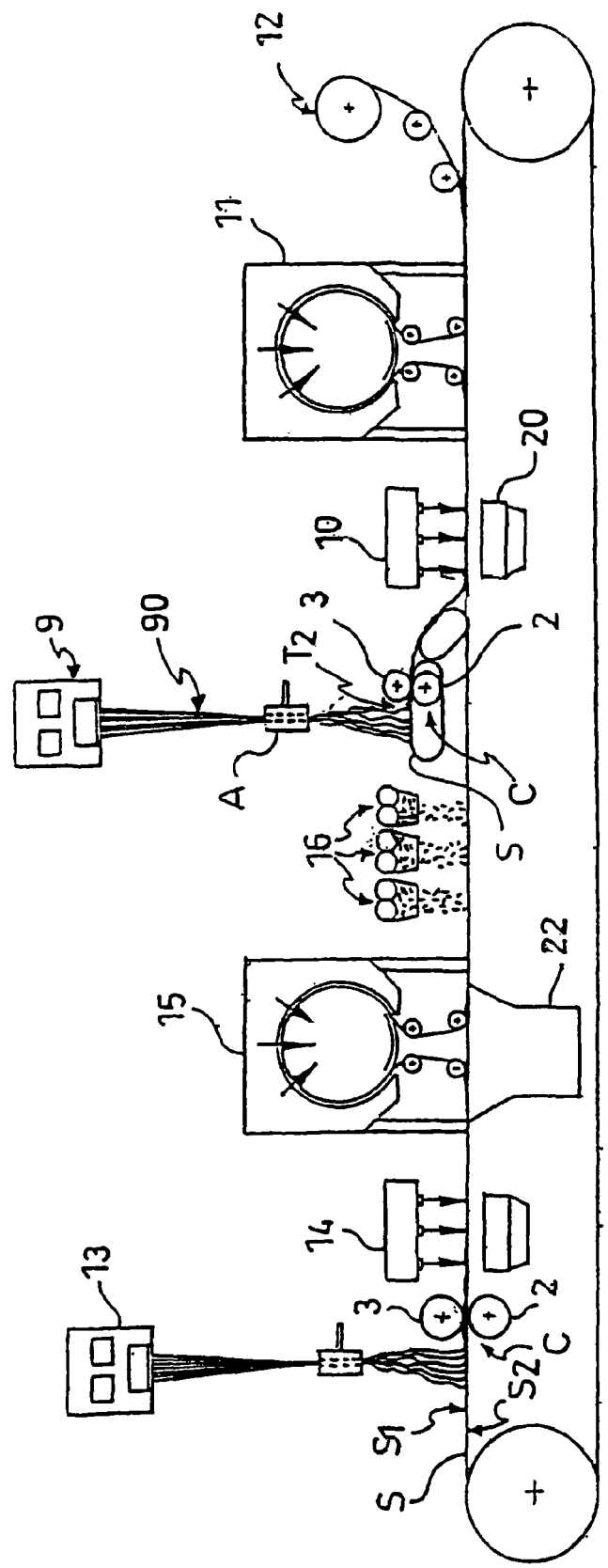
FIG. 15b is a schematic view of a manufacturing process in accordance with a fifth variant embodiment.

With reference to FIG. 14a, a method for the production of multi-layer nonwoven fabric comprising outer layers made with splittable filaments according to the abovementioned technology will be now described. In any case, the subject method comprises the following steps:

a) laying at least one layer $T_1$ of continuous splittable bi-component lobed polymer filaments on a suitable support S;
b) treating said layer $T_1$ such as to obtain an increase in the thickness thereof as disclosed above;
c) laying on said at least one first layer $T_1$ at least one layer $T_3$ of absorbent material fibres 80;
d) laying at least one second layer $T_2$ of splittable bi-component lobed polymer filaments on said at least one layer of absorbent material fibres $T_3$;
e) treating said layer $T_2$ such as to obtain an increase in the thickness thereof as disclosed above;
f) consolidate said layers $T_1$, $T_2$ and $T_3$ by hydro-entanglement.

Preferably, step b) and step e) take place by said layer $T_1$ and said layers $T_1$, $T_2$ and $T_3$, passing between two rollers, respectively, onto a support having a contact surface to said filaments being provided with ribs alternating with grooves as specified above.

As stated above, the hydro-entanglement of the laid filaments layers takes place such as to obtain a multi-layer nonwoven wherein the bi-component lobed polymer filaments are split into single mono-component micro-filaments entangling with one another and with the fibres of the absorbent material.

Particularly, splittable bi-component synthetic lobed filaments can be formed by separately extruding individual polymers in a molten state in the form of threads 70, 90 exiting from orifices, of capillary dimensions, of a spinneret 7, 9 and linking them beneath the spinneret. The polymers at the molten state are linked in a single fibre combined by extrusion of the individual polymer threads in such directions to cause the contact thereof and the adhesion thereof, such as described in U.S. Pat. No. 6,627,025 herein incorporated by reference. A suction fan A positioned underneath the spinneret has the function of sucking and conveying the individual threads of extruded polymer in order to favour the bonding thereof into a single filament.

The synthetic filament is composed of two threads of a single polymer (bi-component), be they homopolymers, copolymers or blends thereof. The polymers may be selected from polyesters, polyamides, polyolefins, polyurethane, polyester modified with additives, polypropylene, polyethylene, polypropylene terephthalate, polybutylene terephthalate.

Preferably, such polymers may be selected such that in the fibres adjacent polymers cannot blend or in any case have poor affinity in order to favour the subsequent separation thereof. Alternatively, the polymers may be additized with lubricants that prevent the adhesion thereof. In addition, as the longitudinal, axial portion of the fibre usually has a greater force of cohesion than the peripheral portion, it may be advantageous to spin bi-component filaments so as to leave an axial hole or in any case a weakened axial portion.

As shown in FIG. 14a, once a layer of splittable bi-component lobed polymer filaments has been laid through the special spinneret 7 onto a conveyor belt S such as to create a first layer of spun-bonded nonwoven $T_1$, one layer of absorbent material $T_3$ such as cellulose pulp is laid on said layer of nonwoven.

Subsequently, a second layer $T_2$ of nonwoven substantially identical to that prepared previously is laid on the layer of cellulose pulp $T_3$, such as illustrated in FIG. 14a at the station identified with reference number 9.

At this point, the fibres are subject to hydro-entangling at the hydro-entangling station 10. This treatment, widely known per se, advantageously enables to split the polymer filaments that compose the nonwoven outer layers nonwoven in micro-filaments and to entangle them with one another and with the cellulose pulp fibres.

Preferably, the hydro-entangling is made not only on side $S_1$ of the support S on which the filaments are laid but also on side $S_2$, opposite side $S_1$, through special through holes (not shown in the figures) and suitable equipment positioned on said side $S_2$ (not shown).

FIGS. 12 to 14 also schematically represent a conventional filtering device 20 for the water originating from the hydro-entangling machines positioned after the cellulose pulp laying step. Said device has the function of recovering the water of the hydro-entangling machine and filtering it of any cellulose pulp fibres besides filtering the chemical components that are contained in the fibres and may be released in the course of hydro-entanglement.

Figure 14B:
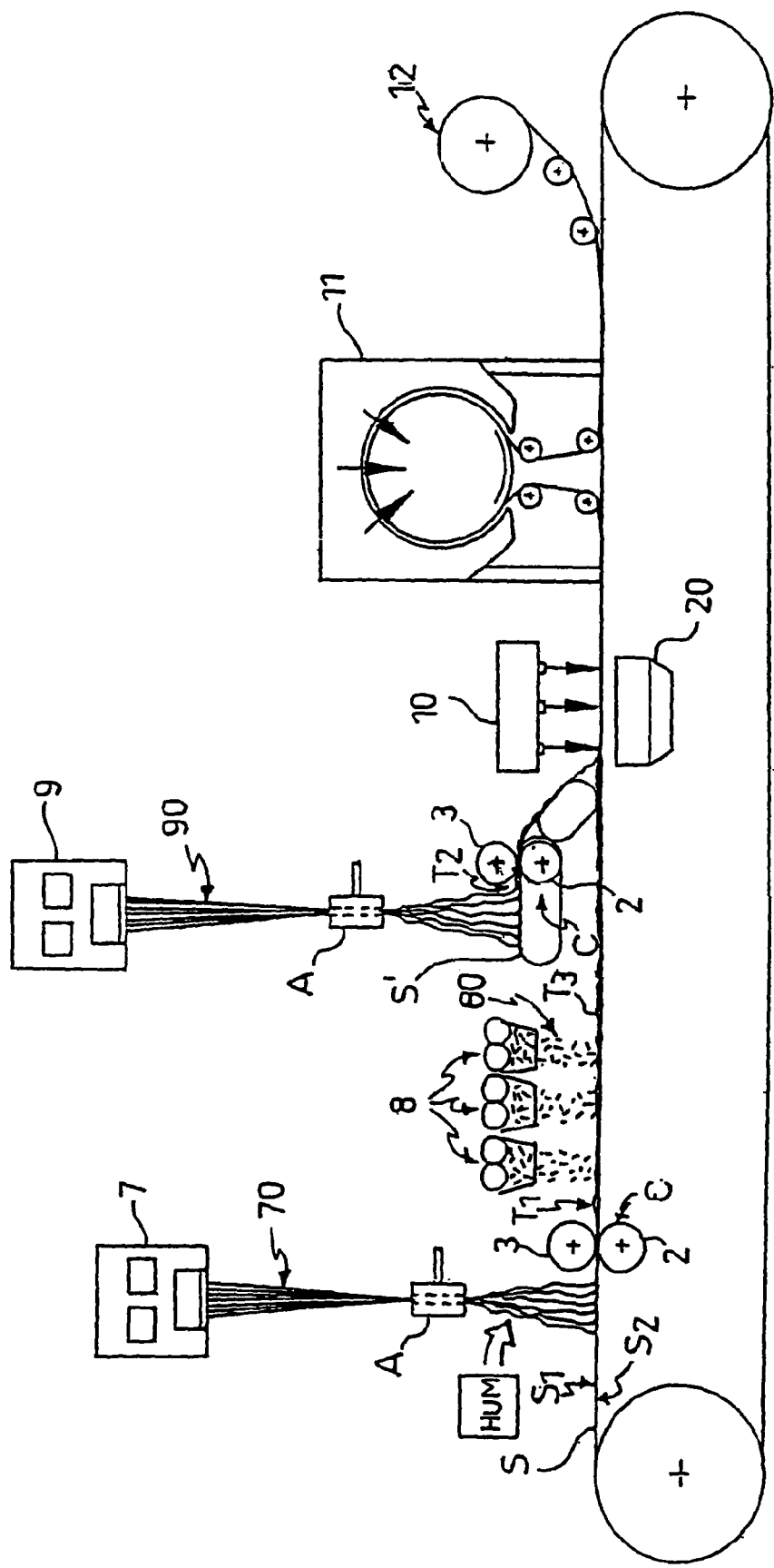
FIG. 14b is a schematic view of a manufacturing process in accordance with a third variant embodiment.

In accordance with a further variant embodiment of the invention, FIG. 14b illustrates a support S', identical to that described above, on which the second layer $T_2$ of nonwoven filaments is laid. As will be seen, said S' is at a different level from support S on which the first layer $T_1$ is laid. Thereby, the second layer $T_2$ can be separately subjected to thickening (embossing). Thickening only layer $T_2$ is advantageous in that two substantially even layers can be obtained.

Subsequently to the thickening treatment, the layer $T_2$ is carried and laid on the layer of absorbent material fibres $T_3$, by support S' or by a conventional conveyor belt, such as described above, and the three layers are subjected together to hydro-entanglement.

The drying step in the dryer 11 and the final winding on roller 12 take place as described above.

A further advantage also in relation to the technology that employs splittable polymer filaments lies in the fact that a greater density of individual micro-filaments per each filament is obtained. In other words the filament divides into a number of components at equal initial dimension, i.e. the micro-filaments that are obtained are at least 10 times finer, preferably up to 100 times finer.

Regardless of the type of traditional spunbonded or splittable filament used in the case one wishes to pre-entangle the nonwoven before bonding it into the form of a multi-layer composite (FIGS. 15a and 15b), the steps are as follows: laying the first layer $T_1$ by means of the spinneret 13 or a carding machine, pre-hydro-entangling through equipment 14, drying through equipment 15, laying cellulose pulp $T_3$ through equipment 16, laying the second layer $T_2$ through spinneret 17 or carding machine, hydro-entangling with hydro-entangling machine 18, drying through equipment 19 and rewinding onto a roller 21.

The manufacturing method and plant may as well provide a dewatering step or station 22 associated to the drying step or station. The advantage of a pre-hydro-entangling step is that it allows to create a first layer of spunbonded lobed polymer bi-component filaments thanks to the greater density of the entangling of the micro-filaments of said filaments, favours the laying of filaments of absorbent material and prevents the partial loss thereof through spaces too wide, which are left by prior art technologies.

As mentioned previously, the step of laying fibres of absorbent material is preferably made with cellulose pulp fibres having a length that may vary from 0, i.e. cellulose powder, to 2.5 mm, preferably from 1 to 2 mm.

In addition, the process according to the invention may provide a drying step after the hydro-entangling step and, preferably also after the pre-hydro-entangling step.

A further step may consist in the elimination of the water contained in the fibres by means of a dewatering step. Particularly, said step consists in arranging a condenser 22 below support S and for example at dryer 15 to which an entirely conventional suction fan (not shown) is usually coupled up. The air sucked through the holes made on said support is conveyed into said condenser where it releases the water contained therein. Equipment of this type is described for example in patent application PCT/IT2004/000127 of the same applicant.

The method may also comprise an embossing step to make products with patterns of the multi-layer nonwoven. Particularly, the embossing may consist in a calendering treatment made by making the nonwoven being heated and pass under pressure between a pair of engraved rollers, in accordance with conventional techniques, or through a further step in a hydro-entangling machine. It should be noted that the term "embossing step" is not referred to a consolidation of the nonwoven as occurs according to the prior art mentioned previously but is simply enabling to make captions and/or three dimensional drawings in order to tailor or decorate the nonwoven through a "thereto-embossing" or "hydro-embossing" calender, in this case in the hydro-entangling process.

Preferably, the process comprises sucking the air at room temperature through the above-mentioned through holes (non shown in the drawings) made in the support S for the fibres. In this way, the splittable lobed polymer filaments, laid at the molten state, are cooled and cured.

Still more preferably, said method may comprise one or more of the following final steps, known per se, in order to increase or add additional characteristics to the end product: coloring or finishing of a chemical nature as the anti-pilling treatment and the hydrophilic treatment, antistatic treatment, improvement of flame proof properties, substantially mechanical treatments such as napping, sanforizing, emerizing.

In addition, the nonwoven may be subject to a further process of multicolor printing using the equipment described in patent application PCT/IT2004/000127 in the name of the same applicant. In this case, a nonwoven sheet at the end of the process described above may be printed directly in-line following the steps of:

providing equipment for nonwoven printing comprising a moving support for the transport of said nonwoven and at least one moving print organ;

feeding said nonwoven sheet to said equipment;

performing the printing on said nonwoven under the command and control of a command and control unit, in which said command and control unit is operatively connected with said support and at least one printing organ in order to detect electrical signals originating from said support and at least one print organ, transforming said signals into numerical values representative of the state of their angular speed and torsional moment, comparing said numerical values with ratios of preset numerical values of said angular speeds and torsional moments and sending signals to said support and at least one print organ in order to correct any variation of said values that fall outside said ratios.

Finally, the process in accordance with the present invention may comprise a step of winding the nonwoven onto a roller 21.

The method of the present invention enables to obtain various types of product:

A. single-layer fabric with basic weight of between 8 and 50 g/m². The manufacturing method is such as illustrated in FIG. 12. The filament used may be either a synthetic bi-component lobed filament, splittable with a hydro-entangling machine or a normal lobed spunbonded fibre.

B. multi-layer fabric with single-layer hydro-entangling or three-layer hydro-entangling with or without pre-hydro-entanglement. For example, the product may be a three-layer, one of which is a central cellulose pulp layer and the outer layers with different combinations of the technologies illustrated above (20 to 200 g/m²).

In any case, regardless of the type of single-layer or multi-layer nonwoven, the tactile and visual characteristics of the individual ply which forms it and differentiate it from any other ply comprise, weights being equal, a 3-5 times greater thickness, softness and smoothness similar to cotton and a cotton wool-like appearance, i.e. similar to a mellow and delicate flock, as well a degree of resistance to the wearing which is from 1.5 to 2 fold greater.

Particularly, and by way of non-limiting examples, exemplary fibres obtainable in accordance with the inventive method are described below.

Splittable Bi-Component Spunbonded Polymer Synthetic Filaments

Preferably, the splittable bi-component lobed polymer filaments are composed of micro-filaments of polymer such as those described above with reference to the manufacturing method. The micro-filaments may have a diameter of between 0.5 dTex and 0.9 dTex and the corresponding filaments may vary according to the number of micro-filaments that compose it but generally are of dimensions of between 1.7 dTex and 2.2 dTex.

As to a three-layer nonwoven having an inner layer of cellulose pulp fibres and two outer layers of polymer filaments consisting of two different splittable lobed polymer components such as polypropylene/polyethylene wherein 50% is fluff pulp and 50% is spunbonded, analytical tests have shown the following physical characteristics:

weight in grams per square meter ranging between 20 and 200, preferably between 30 and 50;

tensile strength in the machine direction expressed in Newton per 5 cm (N/5 cm) between 70 and 150, preferably between 80 and 120, whereas in the cross-direction between 30 and 75, it is preferably between 35 and 65 for a 45-50 g/m$^2$ product; 50% fluff and 50% 2 continuos filament layers elongation, calculated as a percentage of the length in a relaxed state, ranged between 35% and 85% in machine direction (MD), preferably between 45% and 75%, whereas it ranged between 70% and 130% in the cross-direction (CD), preferably between 80% and 110%;

final content of the cellulose pulp fibre ranged between 30% and 75% of the total weight of the nonwoven;

power of absorption calculated as a percentage of total weight in relation to the weight of the dry nonwoven was between 600% and 800% (according to the percentage of pulp in the end product).

A non-limiting example of one embodiment of the process according to the present invention is described below.

EXAMPLE

Isotactic polypropylene polymer material has been employed to carry out this example, having a melt flow rate of 40 g/10 min, such as established by ASTM D-1238, in the form of "chips". The polymer has been loaded in an extruder connected to a spinneret having an operating pressure of about 9646 kPa. The spinneret consists of capillaries having a diameter of 0.038 cm and a slot length of 0.152 cm. The molten isotactic polypropylene passes through the spinnerets at a speed of 0.6 g/min/hole and is extruded at a temperature of 227° C. The polymer is random laid on a perforated support having a fibre-collecting surface provided with truncated cone-shaped ribs of 0.9 mm height and alternating with specular grooves, a 0.5 mm$^2$ head pressure surface and a total pressure surface onto the nonwoven of 9-7%. Subsequently, the support is moved forward until reaching two rollers of an embosser where it is pinched between said rollers together with the non-consolidated polymer fibre ply carried thereonto. The pressure applied by the embosser, which normally ranges between 10 and 100N/mm, is about 45N/mm whereas the operating temperature, which normally ranges between 80 and 200° C., is 140° C. the rotation and dragging speed of the ply, which varies between 20 and 600 m/min, is 300 m/min. At the calender outlet, the consolidated ply has a cotton wool-like appearance, is soft, has a weight in grams ranging between 8 and 20 g/m$^2$ and is up to five times thicker than a spunbonded nonwoven of the same weight in grams, which is usually no more than 0.18 mm thick, and has a cohesion of 1.5 fold greater. Now, the continuous ply is winded on a roll to be then carried to a subsequent manufacturing line or, in the case of in-line operation, to the hydro-entangling station to be subjected to the normal treating conditions. It should be noted, however, that the end product does not exhibit substantial modifications of the tactile, thickness and functional characteristics such as described above.

It should be appreciated by what has been stated above that the present patent application provides a method for manufacturing a particularly soft, smooth, thick and resistant nonwoven, as well as a nonwoven obtainable by said method.

Furthermore, those of ordinary skill in the art may carry out a number of modifications both to the method and the nonwoven, all being within the scope of protection of the claims appended herein.

Figure 17:
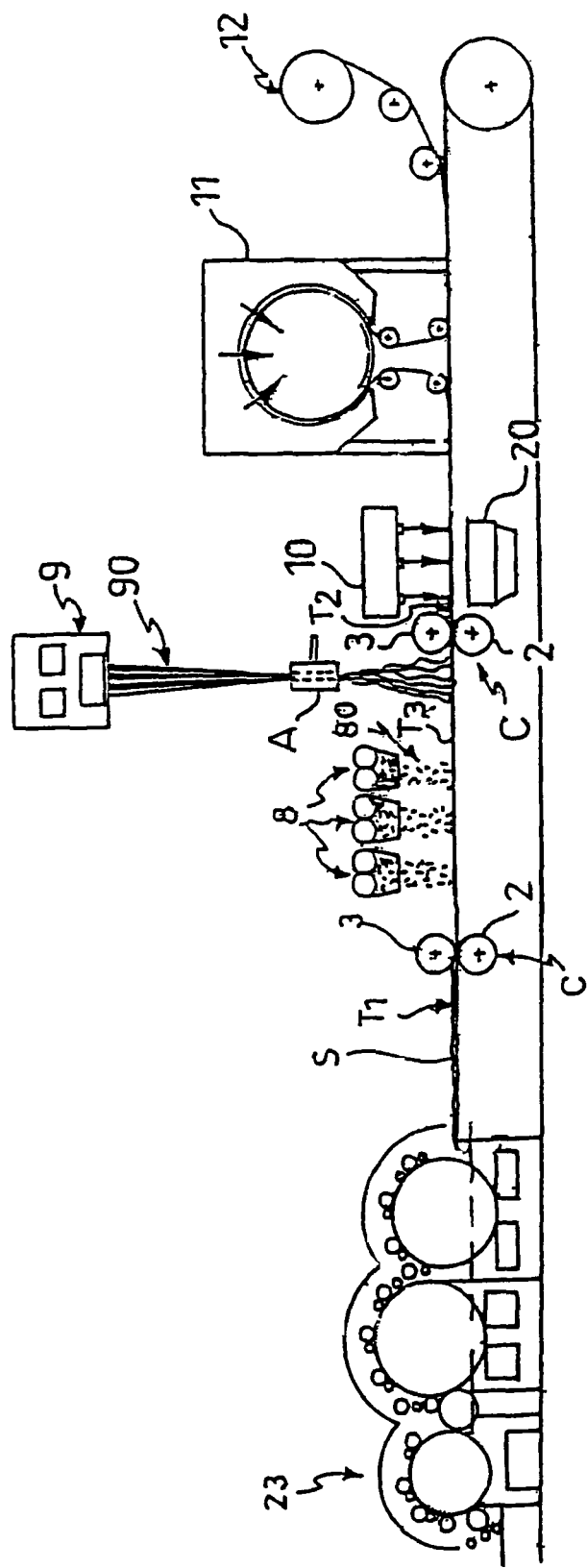
FIG. 17 is a schematic view of a manufacturing process in accordance with a sixth variant embodiment of the invention.

Referring to FIG. 17 wherein the same reference numbers as the reference numbers in FIG. 14a designate the same working stations, there is schematically represented a manufacturing line or a method for manufacturing a three-layer carded fibres/cellulose pulp/lobed spunbonded mixed nonwoven.

Compared to the method described in FIG. 14a, this method is different in that the first spinneret 7 for laying the first nonwoven layer T$_1$ is replaced with a conventional carding machine 23.

It should be noted that, also in this case, all the variants discussed above are valid, i.e. the nonwoven layers can be previously hydro-entangled, the second nonwoven layer T$_2$ can be laid and passed through the compactor or embosser on a different level from any previous laying of fibres and the above-mentioned supplementary machining operations such as moulding and decoration (thermo-embossing) may be provided.

Furthermore, in the mixed multi-layer nonwoven, either the first laid layer, such as illustrated in FIG. 17, or the second layer can be the carded layer.

Figure 18:
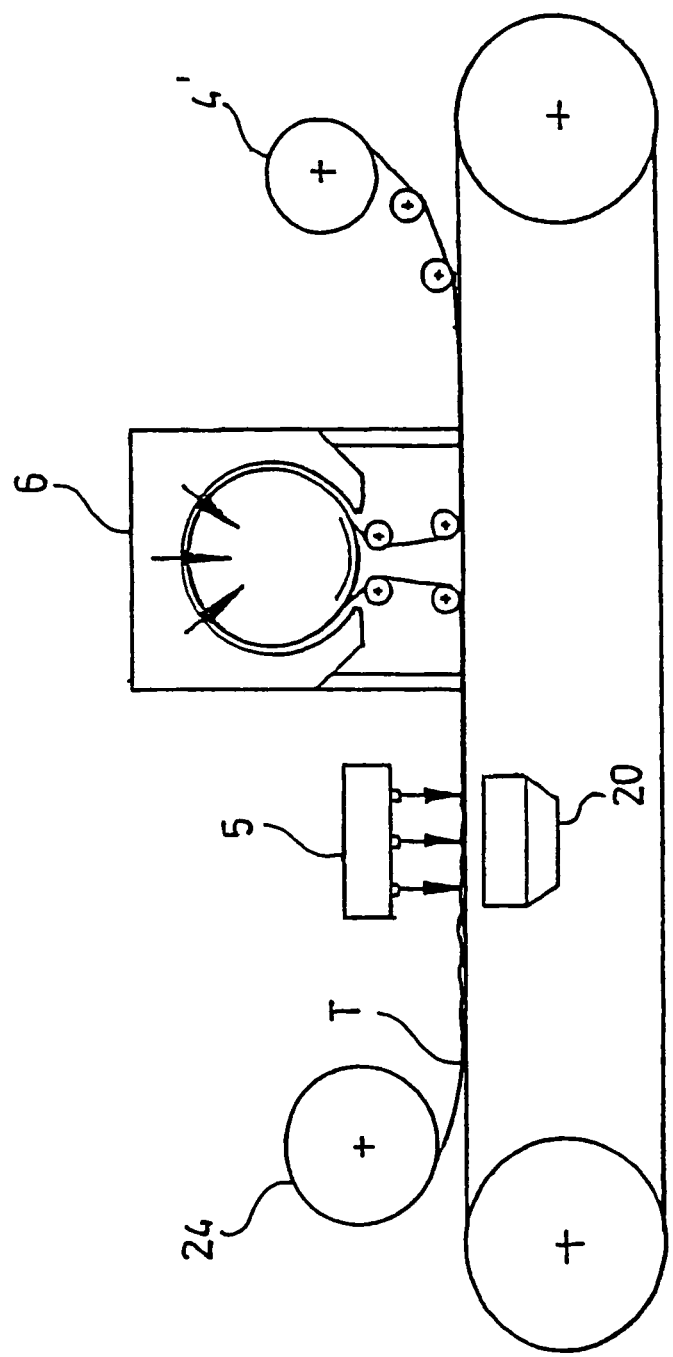
FIG. 18 is a schematic view of a manufacturing process in accordance with a seventh variant embodiment of the invention.
Figure 19:
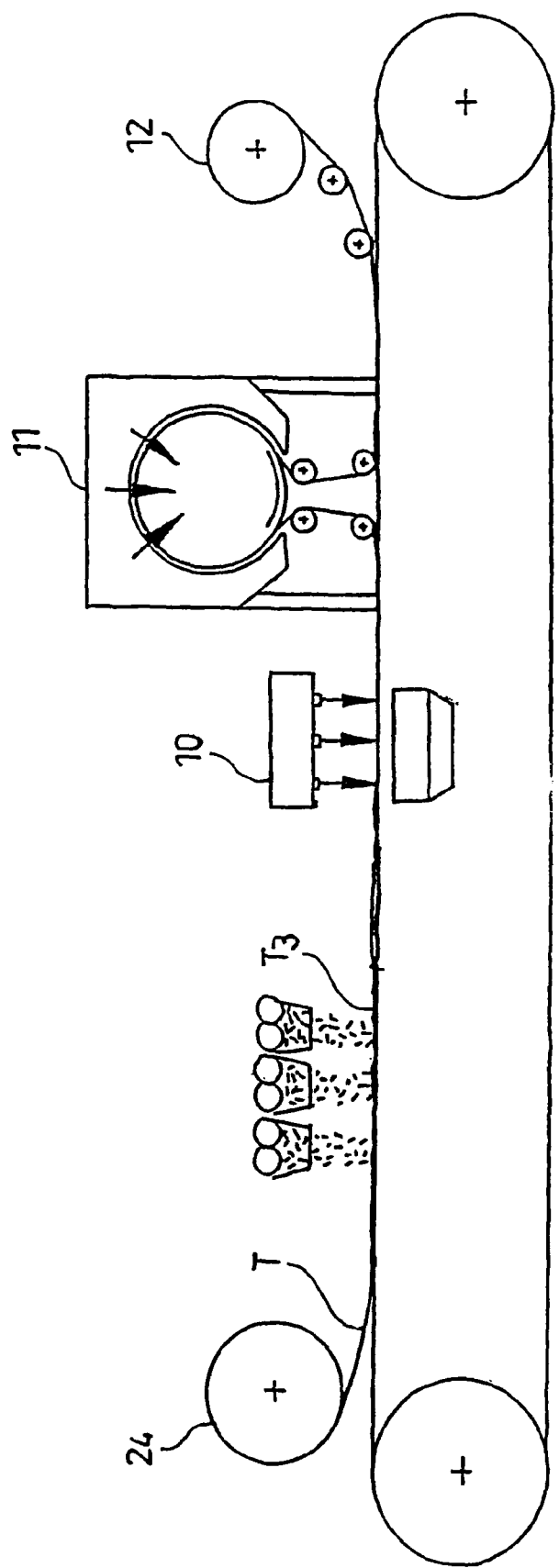
FIG. 19 is a schematic view of a manufacturing process in accordance with an eighth variant embodiment of the invention.
Figure 20:
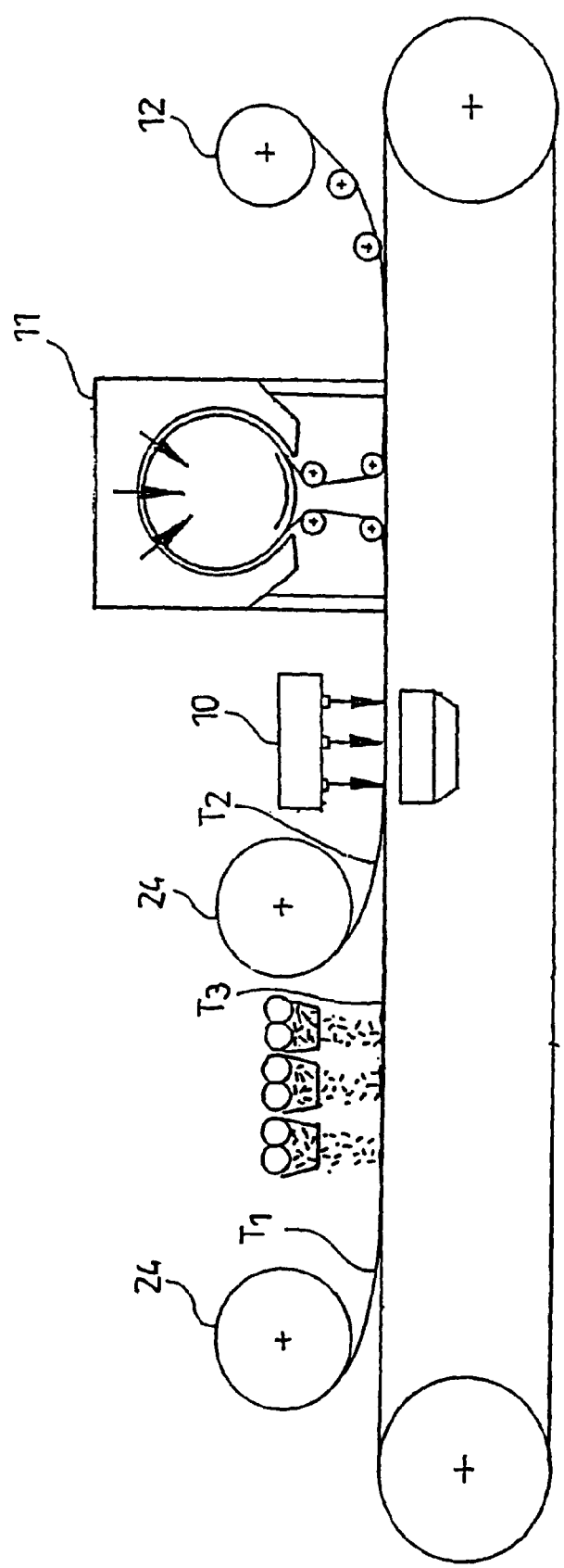
FIG. 20 is a schematic view of a manufacturing process in accordance with a ninth variant embodiment of the invention.

In addition, in FIG. 18 there is illustrated a manufacturing method in which a roller 24 of spunbonded lobed filaments, treated only by a compactor or embosser such as discussed above, is subjected to machining in a different line, in accordance with what has been already discussed above. Particularly, the nonwoven ply T is unwound from roller 24 and subjected for example to hydro-entangling by equipment 5, similarly to what has been described above, then it is dried and finally wound again on a roller 4'.

Similarly to what has been illustrated in FIGS. 13 and 14a, FIGS. 19 and 20 represent identical methods, wherein, again, a roller 24 of spunbonded lobed filaments replaces the spinnerets and the carding machines for laying said fibres, respectively; the other machining operation remaining unchanged. In both latter cases, the variant embodiments described above may be also adopted, such as employing two rollers carrying the same fabric of the type spunbonded/spunbonded, spunbonded/staple fibres treated by compactor or embosser.

Figure 21:
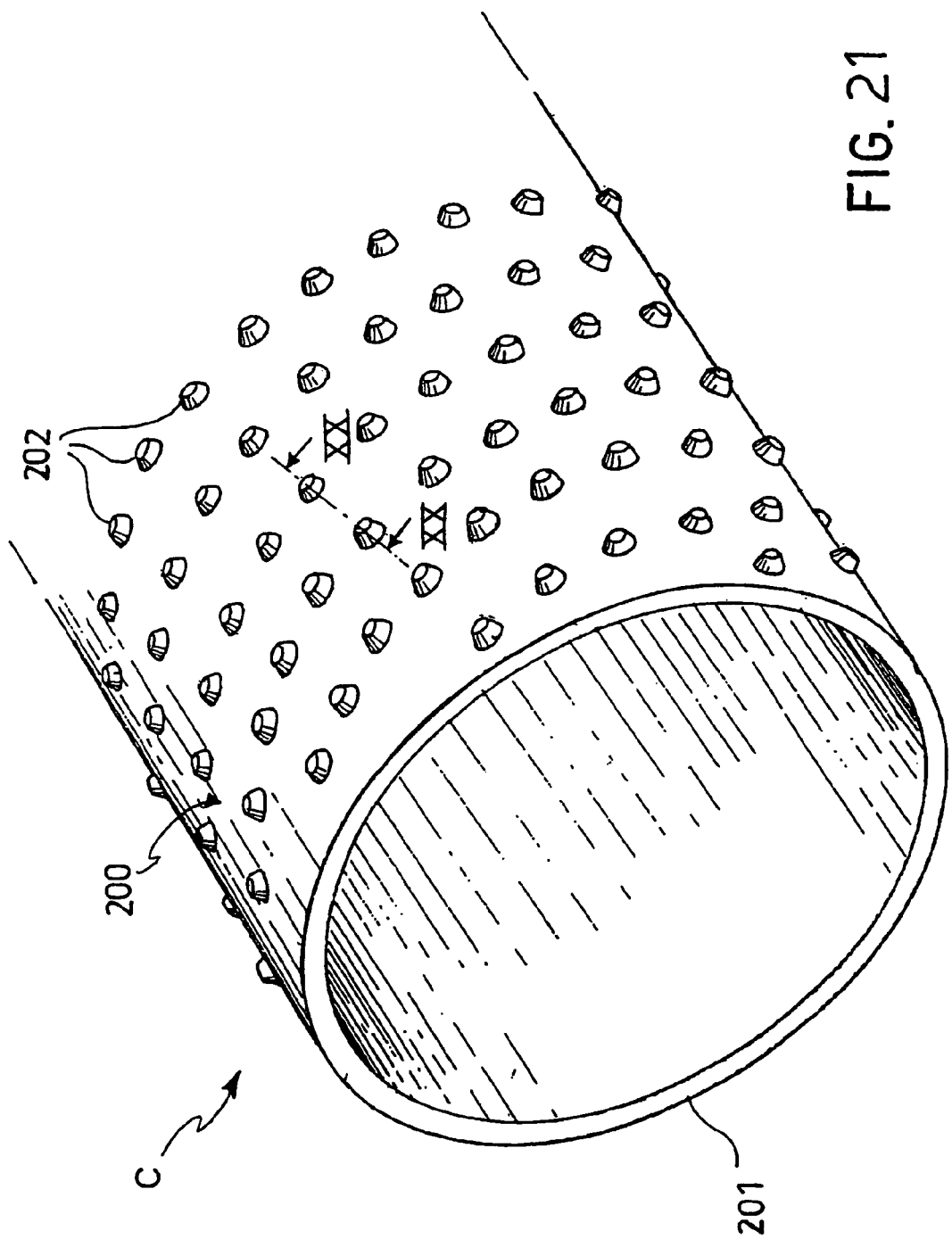
FIG. 21 is an enlarged perspective view of a particular of a roll of the calender according to the invention.

With reference to FIG. 21, a further embodiment of the invention consists in performing the method disclosed above wherein, in particular, said at least one surface is the surface of one of the rollers of the compactor or embosser. The provision of the surface with ribs on one of said rollers allows to avoid the support S disclosed above without altering the result to be obtained, i.e. increasing the thickness and softness of the nonwoven layer so that to look like a cotton wool-like.

In detail, the compactor C comprises two rollers (only one is represented in FIG. 21) similar to the rollers of a conventional compactor or embosser, wherein the surface 200 of one roller 201 is provided with ribs 202 having an height comprised between 0.3 and 5 mm, a free head with a contact surface for the fibres or microfibres having an extension of less than 0.80 mm², said ribs being distributed so that to cover less than 14% of said at least one surface. The ribs can be of the same type as disclosed above with reference to the ribs of the support S and the same preferred range are to be considered herein included, too.

Figure 22:
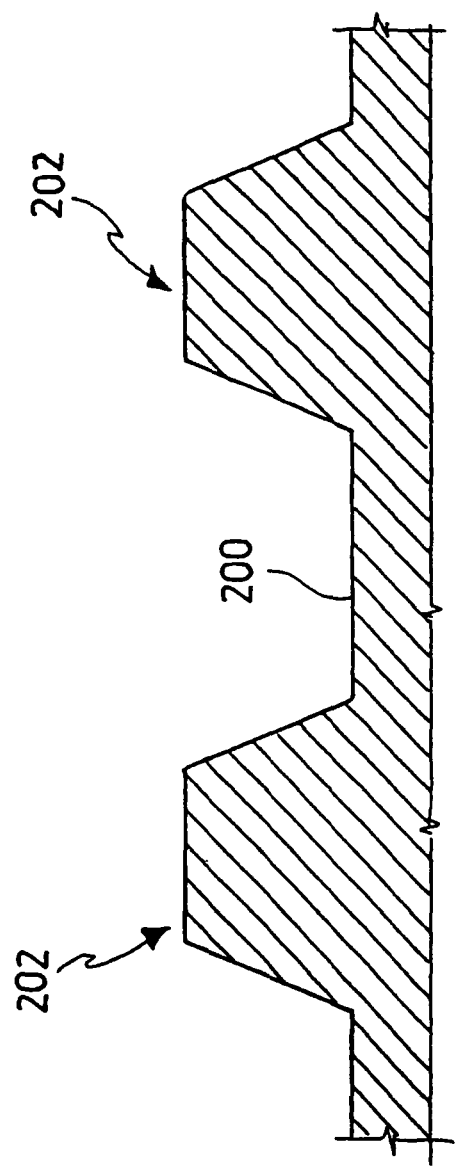
FIG. 22 is an enlarged sectional side view along the line XXI-XXI of FIG. 21.

In particular, said ribs 202 can have a preferred shape substantially in the form of a frustum of cone with a grater circular base attached to the surface 201, as can be better seen in FIG. 22.

The invention claimed is:

1. A method for manufacturing spunbonded or spunbonded/carded nonwoven, comprising the following sequential steps;
   a) extruding continuous thread filaments or microfilaments through spinnerets to produce spunbonded continuous filaments or microfilaments having a lobed cross-section,
   b) laying at least one layer ($T_1$) of spunbonded lobed filaments or microfilaments on a suitable three dimensional support having a surface with ribs in contact with said filaments or microfilaments, and
   c) effecting a pre-consolidation of said layer $T_1$ by passing the layer $T_1$, supported by said three dimensional support, between two rollers, one of the rollers facing the layer $T_1$,
   wherein the ribs of said surface of said support have a height between 0.3 and 5 mm, said ribs being distributed to cover less than 14% of said surface, and
   wherein said roller facing the layer $T_1$ is provided with a metal outer surface and is subject to heating.

2. The method according to claim 1, wherein said ribs have a height between 0.8 and 1 mm, each rib having a free head with a contact surface of between 0.70 and 0.20 mm² and a distribution of said ribs covering from 10 to 5% of said surface.

3. The method according to claim 1, wherein said roller is provided with a thermoplastic smooth rubber outer surface and said roller facing the layer $T_1$ is subject to heating at the melting temperature of said fibres or microfibers.

4. The method according to claim 1, wherein said step b) takes place by treatment with a compactor or an embosser.

5. The method according to claim 1, wherein said support has sectional crimps, steps, dots or line dashes suitable to give three dimensionality to the fibres or microfibers.

6. The method according to claim 1, wherein said support comprises ribs having the shape of truncated pyramid with substantially squared base or frustum cone with oval or circular base.

7. The method according to claim 2, wherein said support is a conveyor belt or tape made of a hard heat-resistant plastic material or a metal sheet.

8. The method according to claim 2, wherein said support is drilled such as to allow for the air to be sucked through the thickness thereof.

9. The method according to claim 1, wherein step b) comprises laying at least one layer of lobed filaments made of material which is at least one selected from the group consisting of PES, PP, PLA, viscose, lyocell, and tencell.

10. The method according to claim 1, wherein said laying takes place by means of a suction fan.

11. The method according to claim 1, wherein said step b) comprises preparing at least one layer ($T_1$) of bi-component lobed polymer fibres that are splittable into microfibres and entangled to one another through hydro-entangling and laying said layer on said support.

12. The method according to claim 1, further comprising a step of laying at least one layer ($T_3$) of absorbent material fibres on said nonwoven layer ($T_1$) subsequent to said step c).

13. The method according to claim 12, further comprising a step of laying at least one further layer ($T_2$) of spunbonded lobed filaments or microfilaments or carded staple fibres on said at least one layer ($T_3$) of fibres of absorbent material.

14. The method according to claim 13, further comprising, subsequent to the step of laying said at least one layer ($T_1$), a step of treating said at least one further layer ($T_2$) to obtain an increase in the thickness thereof, said step being performed by thickening means which comprises the two rollers and a support (S) having the surface with ribs in contact with said filaments.

15. The method according to claim 11, wherein said step b) is carried out by separate extrusion of at least two polymer components from a suitable spinneret beneath of which said two polymer components are linked such as to form one single splittable bi-component lobed filament.

16. The method according to claim 15, wherein said at least two polymer components are selected from the group consisting of polyesters, polyamides, polyolefins, polyurethane, polyester modified with additives, polypropylene, polyethylene, polypropylene terephthalate, and polybutylene terephthalate.

17. The method according to claim 12, wherein said laying of absorbent material is carried out with cellulose pulp fibres.

18. The method according to claim 1, further comprising a step of consolidating said layer ($T_1$) after step c) of treatment to obtain an increase in the thickness thereof.

19. The method according to claim 18, wherein said step of consolidating said layer ($T_1$) includes a step of hydro-entangling the filaments therein.

20. The method according to claim 19, further comprising a drying step after the hydro-entangling step.

21. The method according to claim 20, further comprising a step of winding the nonwoven on a roller after said drying step.

22. The method according to claim 14, further comprising a step of pre-hydro-entanglement after said step of preparing at least one layer ($T_1$) of filaments.

23. The method according to claim 22, further comprising a drying step after said pre-hydro-entanglement step.

24. The method according to claim 20, further comprising a dewatering step, either simultaneous or subsequent to said drying step.

25. The method according to claim 20, further comprising a step of winding the nonwoven on a roller after said drying step.

26. The method according to claim 25, further comprising an embossing step before the winding step.

27. The method according to claim 26, wherein said embossing is carried out by calendering or hydro-entanglement.

28. The method according to claim 1, wherein air is sucked at a temperature either equal to or lower than room temperature through said polymer filaments in order to cool and harden them.

29. The method according to claim 11, wherein said splittable fibres are humidified before being hydro-entangled.

30. The method according to claim 1, further comprising a step of finishing the nonwoven.

31. The method according to claim 1, further comprising a step of multicolour printing of the nonwoven.

32. The method according to claim 1, wherein said support (S) has a surface comprising sections with a substantially perpendicular profile to the vertical laying flow of the fibres alternating with sections with a profile biased of 10°-50° relative to said vertical flow.

33. The method according to claim 13, wherein said at least one second nonwoven layer ($T_2$) is laid on a support (S') which is identical to said support (S) but placed on a different level.

* * * * *